US012769597B2

(12) United States Patent
Lauer et al.

(10) Patent No.: US 12,769,597 B2
(45) Date of Patent: Oct. 20, 2026

(54) EFFICIENT ACCESS TO SERVICES BY CLOUD SYSTEM

(71) Applicant: SAP SE, Walldorf (DE)

(72) Inventors: Martin Lauer, Heidelberg (DE); Kiruthika Raghunathan, Bangalore (IN); Thomas von der Heyde, Walldorf (DE); Shrinivas Karwa, Bangalore (IN)

(73) Assignee: SAP SE, Walldorf (DE)

( * ) Notice: Subject to any disclaimer, the term of this patent is extended or adjusted under 35 U.S.C. 154(b) by 509 days.

(21) Appl. No.: 18/474,734

(22) Filed: Sep. 26, 2023

(65) Prior Publication Data

US 2025/0103406 A1 Mar. 27, 2025

(51) Int. Cl.
*G06F 9/54* (2006.01)
*G06F 8/34* (2018.01)
*G06F 9/30* (2018.01)
*G06F 9/445* (2018.01)

(52) U.S. Cl.
CPC ................ *G06F 9/547* (2013.01); *G06F 8/34* (2013.01); *G06F 9/30181* (2013.01); *G06F 9/445* (2013.01); *G06F 2209/549* (2013.01)

(58) Field of Classification Search
CPC ...................................................... G06F 9/547
USPC ......................................................... 719/330
See application file for complete search history.

(56) References Cited

U.S. PATENT DOCUMENTS

| | | | | |
|---|---|---|---|---|
| 10,621,014 | B1 * | 4/2020 | Ramachandran | G06F 8/30 |
| 12,536,348 | B1 * | 1/2026 | Ciolfi | G06F 30/20 |
| 2007/0118652 | A1 * | 5/2007 | Diedrich | G06F 9/5027 709/226 |
| 2023/0205553 | A1 * | 6/2023 | Yang | G06F 9/451 719/318 |
| 2024/0184652 | A1 * | 6/2024 | Kunz | G06F 9/547 |

OTHER PUBLICATIONS

Michale Wilhelm, "SAP Variant Configuration and Pricing—Extension Concenpt", Apr. 17, 2023, retrieved Aug. 10, 2023 from: https://blogs.sap.com/2023/04/17/sap-variant-configuration-and-pricing-extension-concept/, 6 pages.

* cited by examiner

*Primary Examiner* — Charlie Sun
(74) *Attorney, Agent, or Firm* — Fountainhead Law Group, PC

(57) ABSTRACT

Embodiments facilitate deployment of customized code at a local site, for reference by a service that is being called by a remote system. At a design time, a visual code editor (e.g., Blockly) is utilized to create and store customized code at the local site. During a subsequent runtime, in response to dispatched service call initiated by the remote system, the customized code is retrieved and executed at the local site. By maintaining the customized code locally, embodiments confer security and avoid congestion associated with having the customized code stored remotely (with the remote system). This selective dispatch of a service call for handling by the local customized code, can be implemented based upon an extension scheme.

20 Claims, 14 Drawing Sheets

FIG. 9
4 min 42.3 s
4 min 42.3 s
POST
200
HTTP
Relative URL
/api/v1/statelesspricing
Response code
200
Method
POST
Host
cpservices-pricing-dev-extension-thomas-1.cfapps.sap.hana.ondemand.com
Timings
Start time
End time
Response time
4 min 42.3 s
Processing time
4 min 42.3 s
Self time
4 min 42.3 s
Network I/O
CPU
Other
Waiting
Suspension
Services
Time spent in other services
Calls to other services

FIG. 10
20.7 s
20.7 s
POST
200
HTTP
Relative URL /api/v1/statelesspricing
Response code 200
Method POST
Host cpservices-pricing-dev-extension-thomas-1.cfapps.sap.hana.ondemand.com
Timings
Start time
End time
Response time 20.7 s
Processing time 20.7 s
Self time
CPU
Waiting
Suspension
Other
Network I/O
Services
Databases

EFFICIENT ACCESS TO SERVICES BY CLOUD SYSTEM

BACKGROUND

Unless otherwise indicated herein, the approaches described in this section are not prior art to the claims in this application and are not admitted to be prior art by inclusion in this section.

One increasing trend in computing is the use of software applications hosted at a location remote from the user. Such cloud computing offers convenience by not making access to the software dependent upon the user's physical location.

Another increasing trend in computing, is the use of services. That is, procedures not confined to one particular software application (a conversion between currencies, for example) may be implemented as an outside service, rather than being embedded within the software application itself. Such a service-based architecture can reduce cost by allowing the reuse of code across various different software applications.

SUMMARY

Embodiments facilitate deployment of customized code at a local site, for reference by a service that is being called by a remote system. At a design time, a visual code editor (e.g., Blockly) is utilized to create and store customized code at the local site. During a subsequent runtime, in response to dispatched service call initiated by the remote system, the customized code is retrieved and executed at the local site. By maintaining the customized code locally, embodiments may confer security and avoid congestion associated with having the customized code stored remotely (with the remote system). This selective dispatch of a service call for handling by the local customized code, can be implemented based upon an extension scheme.

The following detailed description and accompanying drawings provide a better understanding of the nature and advantages of various embodiments.

DETAILED DESCRIPTION

Described herein are methods and apparatuses that implement access to services in connection with cloud systems. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
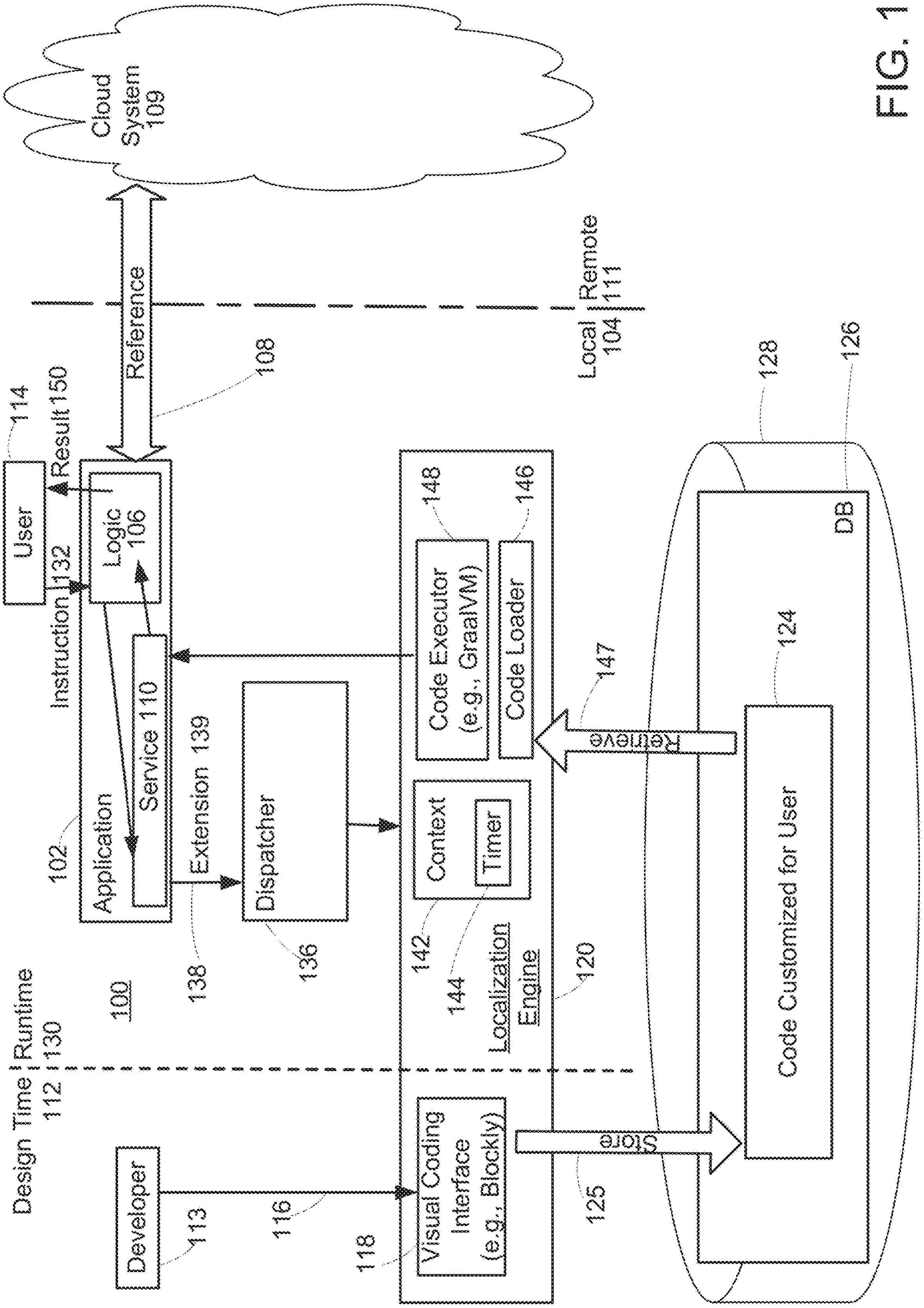
FIG. 1 shows a simplified diagram of a system according to an embodiment.

FIG. 1 shows a simplified view of an example system that is configured to implement services access according to an embodiment. Specifically, system 100 comprises a software application 102 that is part of a local application layer 104. The software application includes logic 106 that is configured to reference 108 a cloud system 109 that is remote 111. The software application further includes a service 110.

During a design time 112, a developer 113 seeks to create code relating to the service, that is customized to the needs of a particular user 114. Accordingly, the developer interacts 116 with a visual coding interface 118 that is provided by a localization engine 120. As described below in an example, one possible visual coding interface that may be used, is the Blockly interface available from Google.

In particular, the developer creates customized code 124 that implements the service in a manner specifically desired by the user. The visual coding interface stores 125 the user-customized code within a database 126 that is present within non-transitory computer readable storage medium 128.

Next, during a runtime 130, the user seeks to instruct the software application to perform processing that involves the service. The application receives user instruction 132, and based upon the program logic references the remote cloud system.

The remote cloud system informs the application that the service is involved in the requested processing. Accordingly, the program logic executes the service.

The service in turn contacts a dispatcher 136. The dispatcher recognizes the service request 138 as implicating user customized code. This recognition may be based upon an extension 139 that identifies the particular service being called.

Accordingly, the dispatcher dispatches the service request to the localization engine. Based upon a context 142 including a timer 144, a loader 146 of the localization engine retrieves 147 the code from the underlying database.

Then, an executor 148 of the localization engine executes the customized code. The executor sends the outcome back to the service. The ultimate result 150 of processing of the user's instruction (e.g., by the service according to the customized code), is then ultimately returned to the user.

Figure 2:
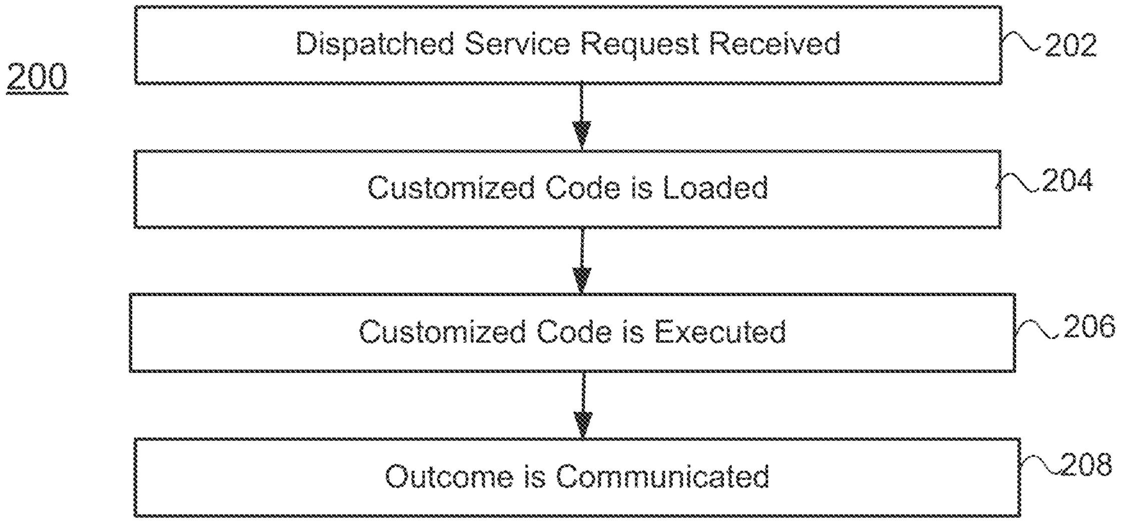
FIG. 2 shows a simplified flow diagram of a method according to an embodiment.

FIG. 2 is a flow diagram of a method 200 according to an embodiment. At 202 a service request dispatched at a first location, is received.

At 204, code is loaded at the first location. At 206, the code is executed at the first location.

At 208, an outcome resulting from execution of the code is communicated for processing with reference to a system remote from the first location.

Further details regarding service access by cloud systems according to various embodiments, are now provided in connection with the following example. In this particular example, access to a service is implemented with a number of components that are available from SAP SE of Walldorf, Germany, including but not limited to:

SAP Business Technology Platform (BTP);
SAP Business Application Studio (BAS);
SAP HANA Cloud database.

EXAMPLE

This specific example relates to implementation of the SAP Variant Configuration and Pricing Service (CPS) in connection with user-customized code that is executed locally. This CPS service offers a customized pricing procedure that is used to calculate prices while creating a sales quotation.

In particular, the SAP offers a library of predefined variant functions, which may be implemented on the front or back end without involvement by a customer. Examples can include but are not limited to:

conversion NUM<->CHAR;
various string operations (e.g., concatenate, partial, length, comparison, others);
determine number of assigned values in multi-value characteristic;
number of days between two dates.

However, in performing SAP CPS customers may seek to utilize one or more of their own, customized variant function (s)—rather than those predefined by SAP. Accordingly, this example offers a SAP customer the ability to generate customized code for local execution in conjunction with SAP CPS. Such local code execution improves performance, by reducing communication bottlenecks otherwise arising due to frequent attempted contacts with the remote SAP backend cloud system.

This particular example utilizes a No Code visual coding development environment based on the Google Blockly library. The example generates the custom Javascript code from the No Code editor.

The custom Javascript code is securely executed within a sandboxed JVM script engine. This example generates custom script/macros from a Visual Coding, and executes the generated code directly (with a scripting engine inside CPS).

Figure 3A:
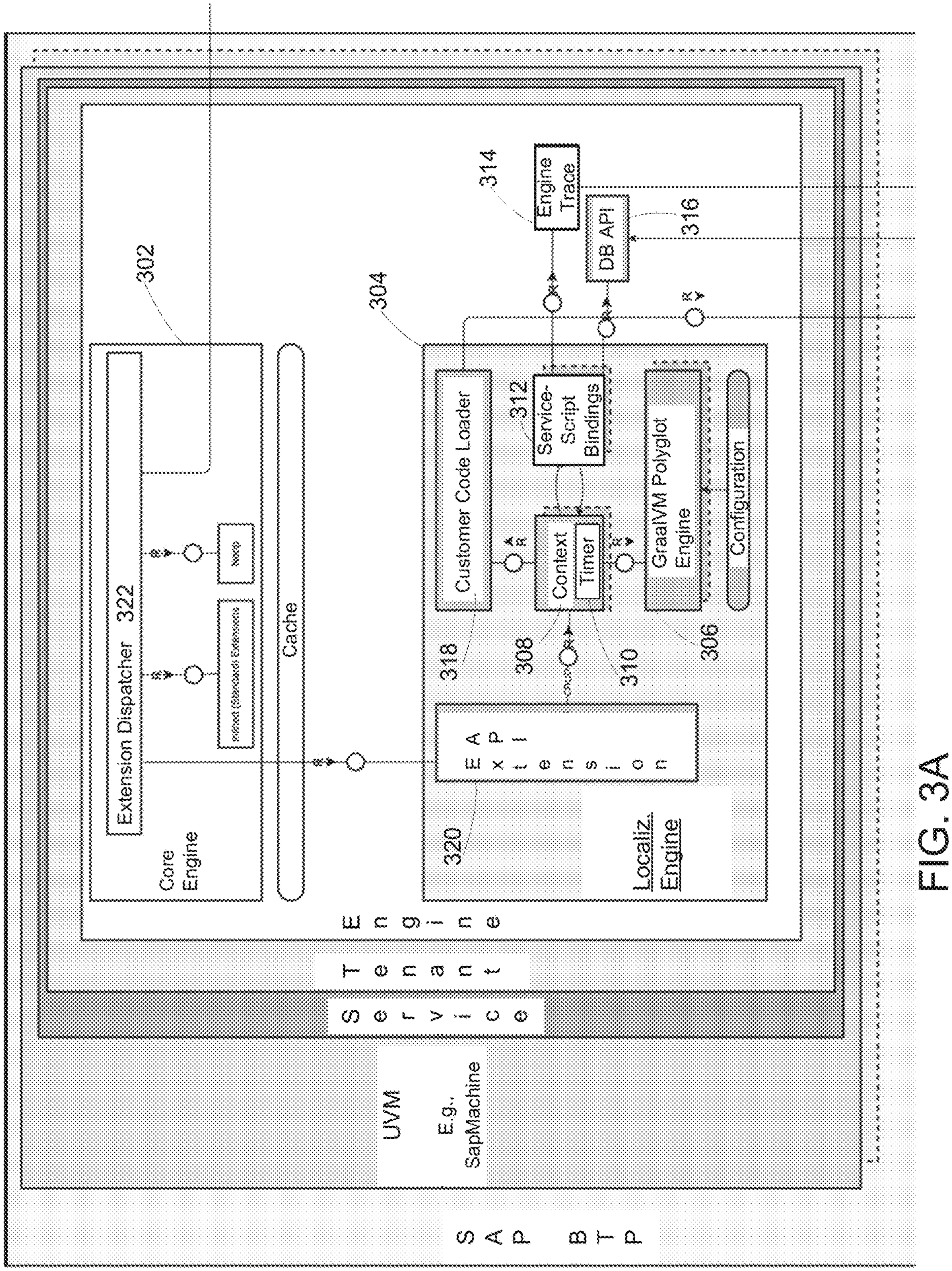
FIGS. 3A, 3B, and 3C are simplified block diagrams showing an example of a system implementing service access during runtime according to an embodiment.
Figure 3C:
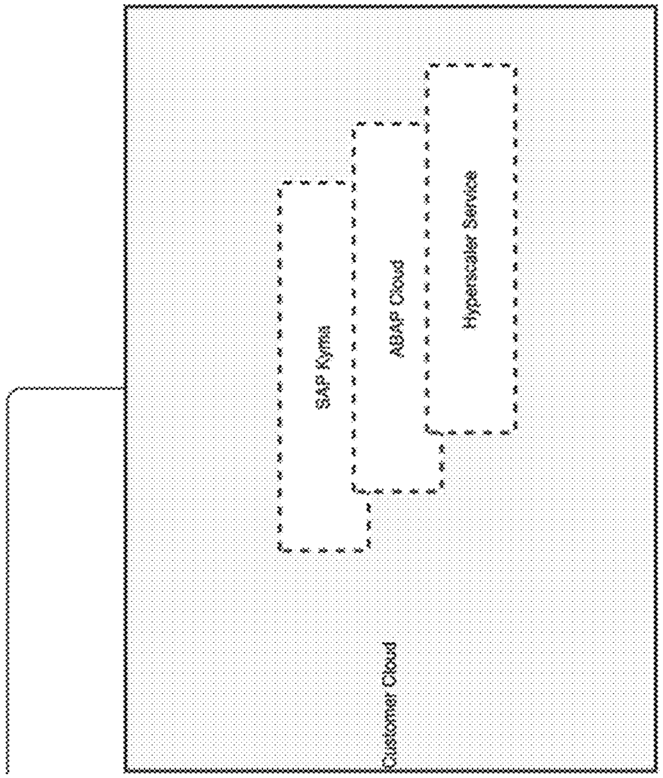
Figure 3B:
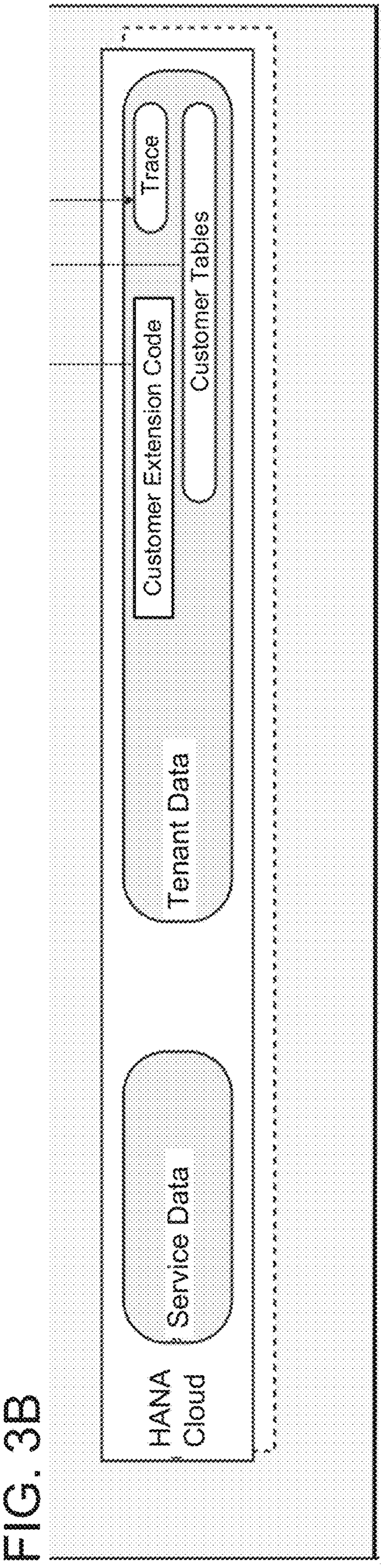

FIGS. 3A-3C show simplified block diagrams of a framework allowing for efficient access of the Variant Configuration and Pricing Service. The top of FIG. 3A shows core engine 302. That core engine performs the dispatching to the various extension runtimes.

The bottom of FIG. 3A shows the localization engine 304 that is managed according to an embodiment. This localization engine allows for the execution of scripts that are created locally for a customer.

FIG. 3B shows the underlying HANA Cloud database that contains the uploaded/deployed customer code and the replicated customer tables. FIG. 3C shows the various options for customers to implement a remote extension (e.g., a service that does not include local, customized customer code).

Embodiments manage interaction with the graal.js engine and ensure proper and secure configuration. Various components of the localization engine are now described.

GraalVM Polyglot Engine 306. This provides at least the Scripting Engine and the Context API. The latter allows execution of evaluated code.

Context 308 with Timer 310. In order to enforce a runtime limit for the execution of No Overhead extension, the SAP Variant Configuration and Pricing service executes the evaluated code inside a Future Task with a timeout.

Bindings 312 between Java Service and Javascript runtime. These support the customer Javascript code calling the APIs provided by the Variant Configuration and Pricing service. Examples are:

1. a Logger 314 that allows customer to add custom entries to the standard extension trace; and
2. a database API 316 that will allow customers to access their replicated tables and use the table data during extension processing (thereby circumventing the limited extension input data structure).

Code Loader 318. This loads the code archive from the database and converts it into GraalVM Sources.

Extension API 320. This supports the execution of an extension function and can be called by the Dispatcher 322.

Figure 4A:
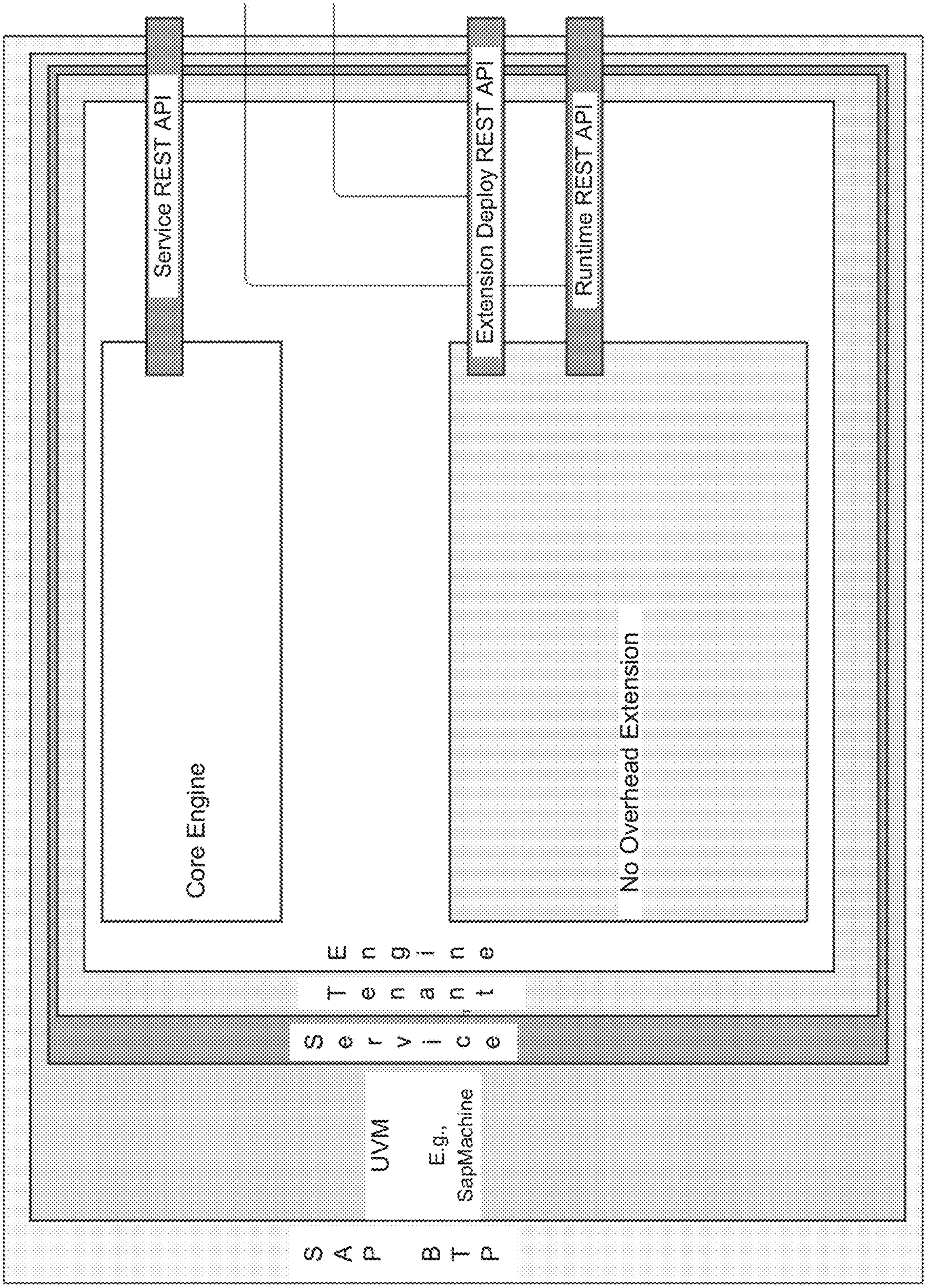
FIGS. 4A and 4B are simplified block diagrams showing an example of a system implementing service access during design time according to an embodiment.
Figure 4B:
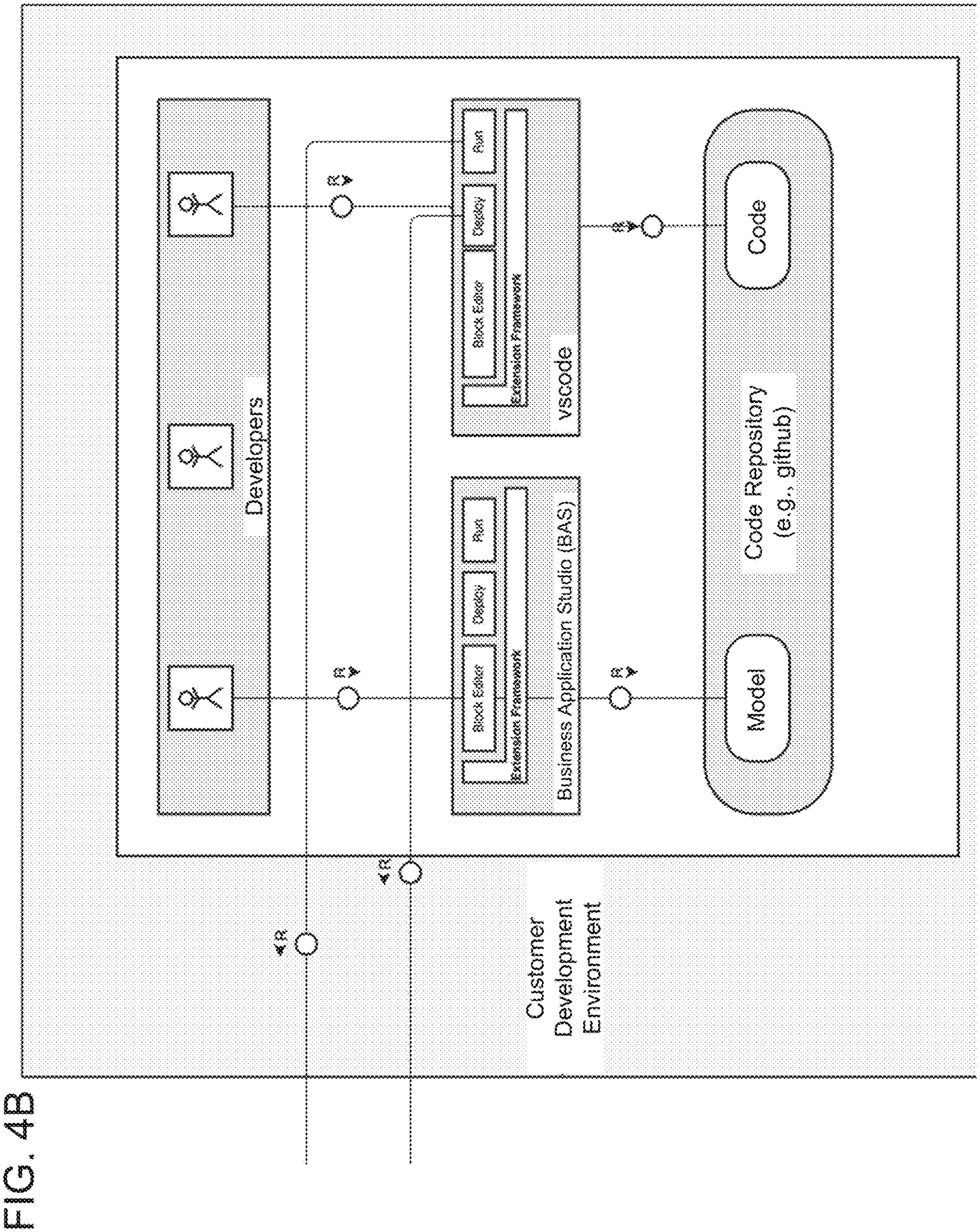

Details regarding the development environment according to this example, are now discussed in connection with FIGS. 4A-4B.

In order to ensure trusted code, in addition to secure Runtime environment, a low-code like modelling environment has been developed. This can be imported as .vsx extension into Microsoft vscode and BAS. BAS may be desirable insofar as it provides further capabilities like project wizard and a simplified git integration.

The extensions may comprise one or more components, including but not limited to:

Model Editor based on the Google Blockly library
Command to generate Javascript code from a model
Commands to deploy model/code onto the service.

The modelling extension in BAS and vscode can interact with the Variant Configuration and Pricing Service via dedicated endpoints. These endpoints allow the deployment of code/model onto the service (Deploy API) as well as performing tests by executing individual extension functions (Runtime API).

Figure 5:
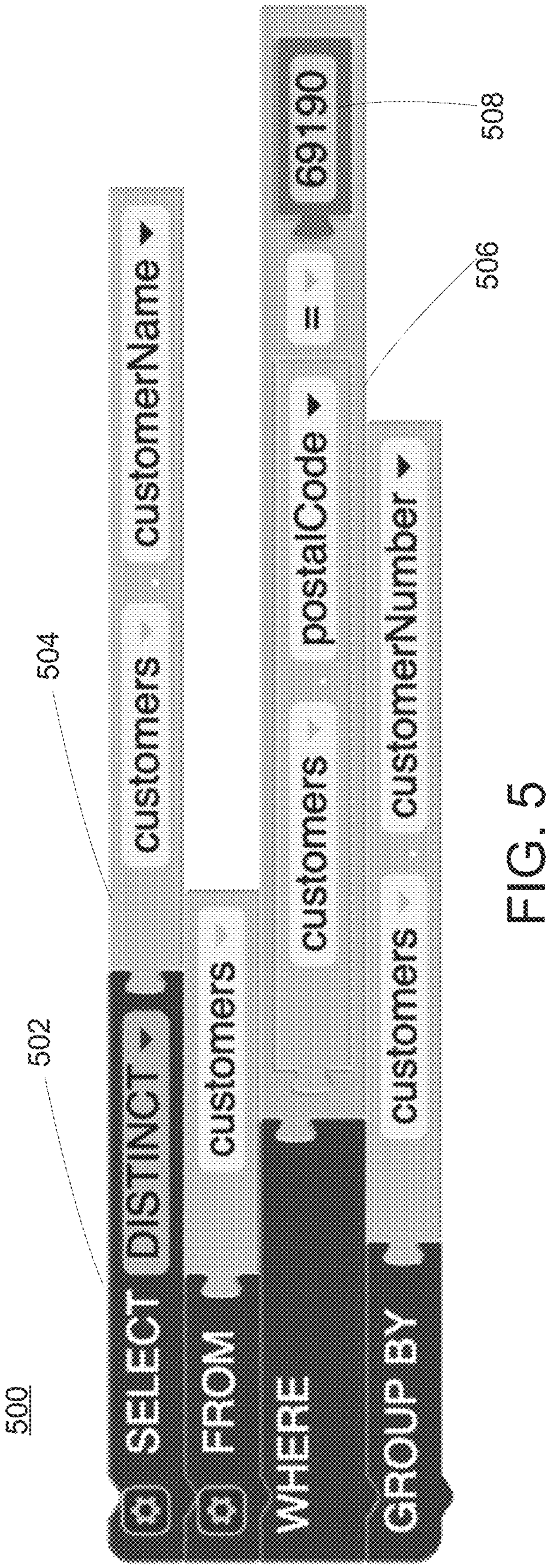
FIG. 5 shows a simplified view of a visual coding interface in the example.

FIG. 5 shows a simplified view of a Blockly visual coding interface 500. This particular interface includes:

Statements & clauses 502;
Tables & attributes 504;
Mathematical operator 506; and
Value input 508.

Additional Blockly elements can include, but are not limited to:

Aliases;
Operators;
Logical operators
Aggregate functions.

A technical description of the functional calls/flow for dispatching, is now provided. In the event that extensions are activated but detailed runtime specification for each extension function are not available, the dispatching process may exhibit a hybrid mode.

Figure 6:
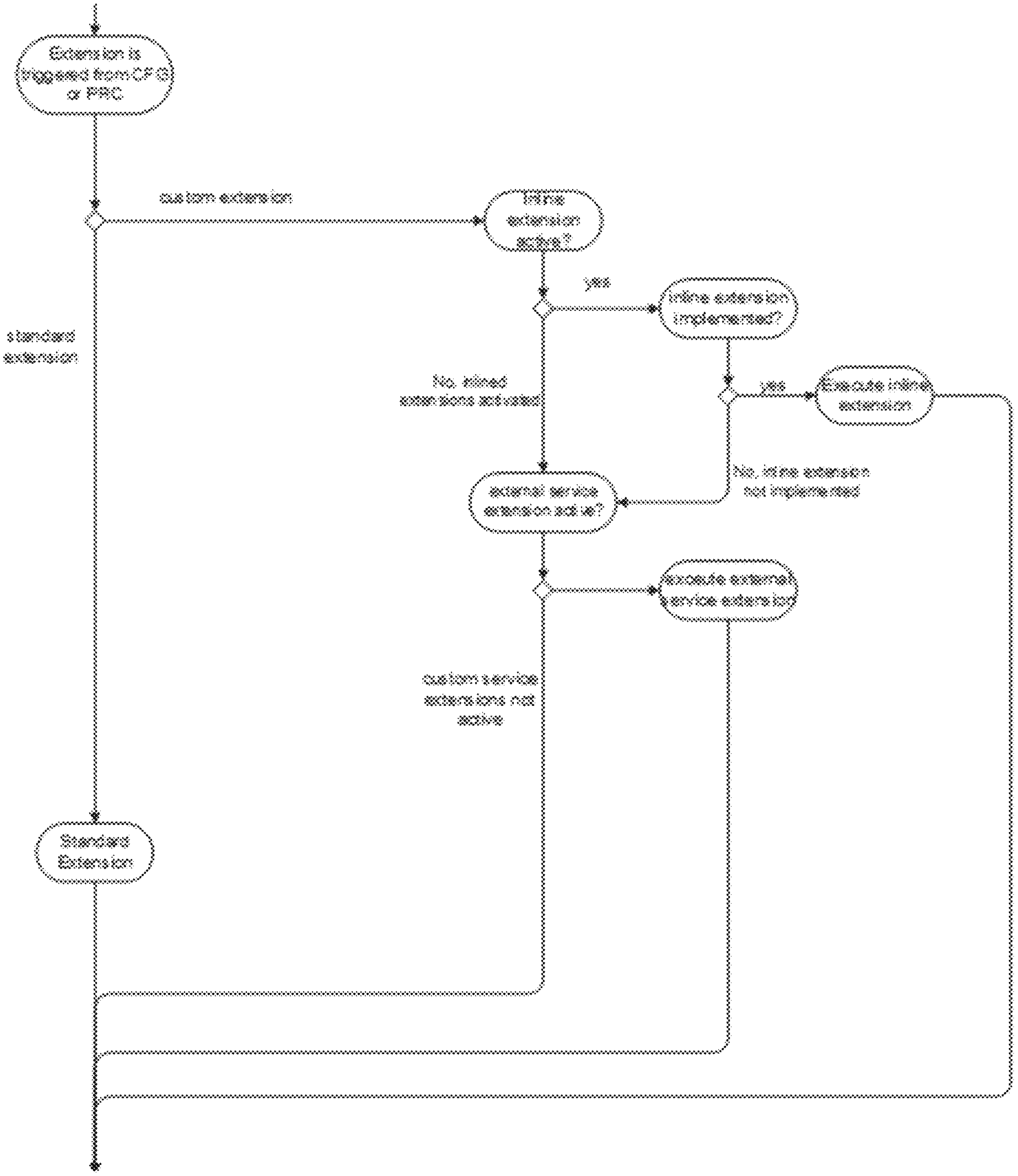
FIG. 6 is a simplified flow diagram showing a hybrid mode of operation.

FIG. 6 is a simplified flow chart illustrating dispatching in a hybrid mode of operation. In particular, the backend is not aware of the Configuration and Pricing service and therefore the standard customizing does not contain detailed configuration option for which runtime shall be used by which extension function.

Therefore, if the customer actives both remote extensions and the localized custom code (e.g., if the remote extension is required because of limitations of the local extension), the service tries both runtimes, starting with the Scripting Engine. The service uses the first runtime that can process the extension function. A specific code may be provided to distinguish this circumstance from error situations.

As shown in FIG. 6, the hybrid dispatch flow is as follows.

Check if the JavaScript function exists as inline extension and process it.

If the function is not implemented as inline extension, check if the function is implemented as external service (cache lookup and by triggering the REST call). If yes: execute it.

Figure 8:
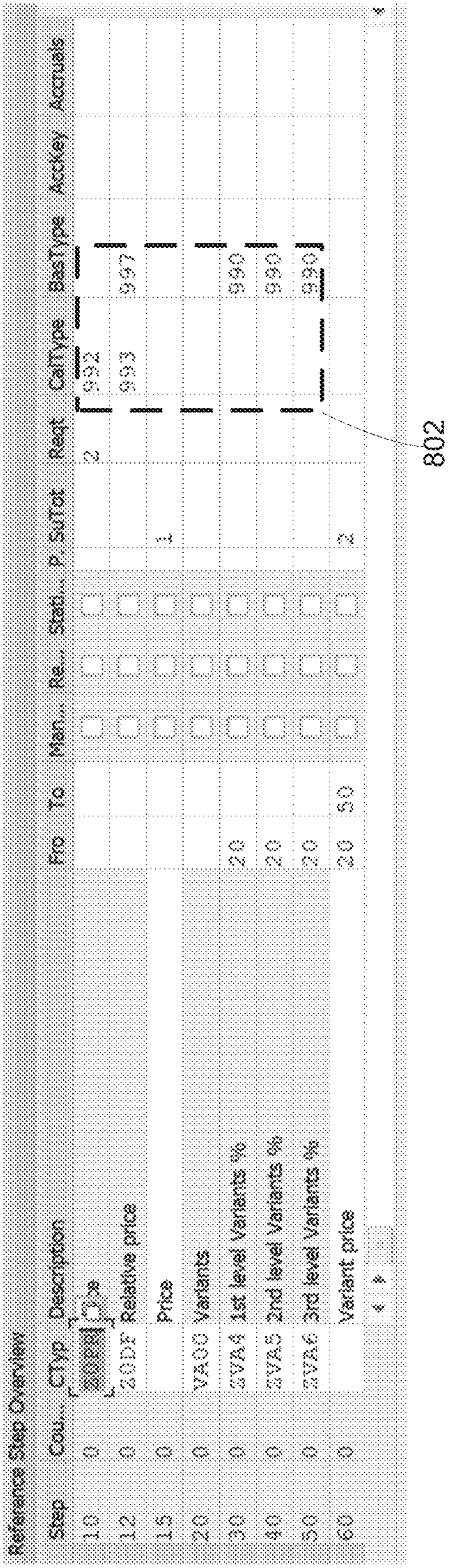
FIG. 8 shows the customizing that is used by the service according to the example.

FIG. 8 shows pricing customizing for the SAP Variant Configuration and Pricing Service, in this example. Here, the standard pricing functionality is extended by the highlighted formulas 802.

The highlighted columns show the mapping of steps in the price calculation to the different types and implementations of extension. For example, step 30 would execute BAS_990 in the SAP (Variant Configuration and) Pricing Service.

These extensions may be implemented either as an external webservice, or as a local extension. In FIG. 8, the reference nos. 992, 993, and 997 are implemented as local extensions. The extension 990 is implemented as an external webservice.

According to one example use case, a customer would like to overturn the condition value calculation in pricing and include a special rounding procedure. Under this customization, the given condition value is rounded and the value of 0.01 per given quantity is subtracted from it.

| ITEM | CONDITION VALUE (EUR) | ROUNDED (EUR) | EXPECTED (EUR) |
|---|---|---|---|
| 3 PC | 99.7 | 100 | 99.97 |
| 8 BOX | 40.50 | 41 | 40.92 |
| 2 KG | 1.10 | 1 | 0.98 |

A performance comparison was made as follows. In order to improve the performance of the remote extensions, caching has been introduced into the Variant Configuration and Pricing Service. This caching caches identical calls to the remote service.

Since most of the extension implementations do not depend remote data but use the provided data only, identical calls can be detected by analyzing the input data for the extension.

Since caching would equalize the difference between local and remote extension, caching was disabled to be able to compare local vs. remote extensions only. The results are summarized in the table below.

| Runtime vs. Response Time | Response Time (sec) |
|---|---|
| Remote Extension | 242 |
| Local Extension | 20 |

Figure 9:
FIG. 9 shows performance results of remote access to a service.
Figure 10:
FIG. 10 shows performance results of localized access to a service according to the example.

More details are illustrated in the screenshots of FIGS. 9 and 10 from the APM tool Dynatrace. FIG. 9 shows Measured Timings for a Pricing Procedure using Remote Extension.

In the "Services" section of FIG. 9, the pricing service performs more than 3000 calls to the remote service. As can be seen from the "Timings" section, this leads to a Network I/O time of nearly 4 minutes and to a total response time of 4 min and 42 seconds.

By contrast, FIG. 10 shows Measured Timings for a Pricing Procedure using a localized extension according to an embodiment. Here, in the "Services" section only one service is being called, once (for authentication). As can be seen from the "Timings" section the Network I/O time is only about 25 ms and the total processing time reduces to about 20 seconds.

It is noted that the enterprise edition of the GraalVM scripting engine provides various sandbox options useful for security. However, other editions (e.g., community) of graal.js (GraalVM Javascript) may only support limiting the number of statements.

Thus, this particular example applies a timeout to each script execution to protect the BTP service from misuse. This timeout involves a context and timer, as are shown in FIG. 3A.

Figure 7:
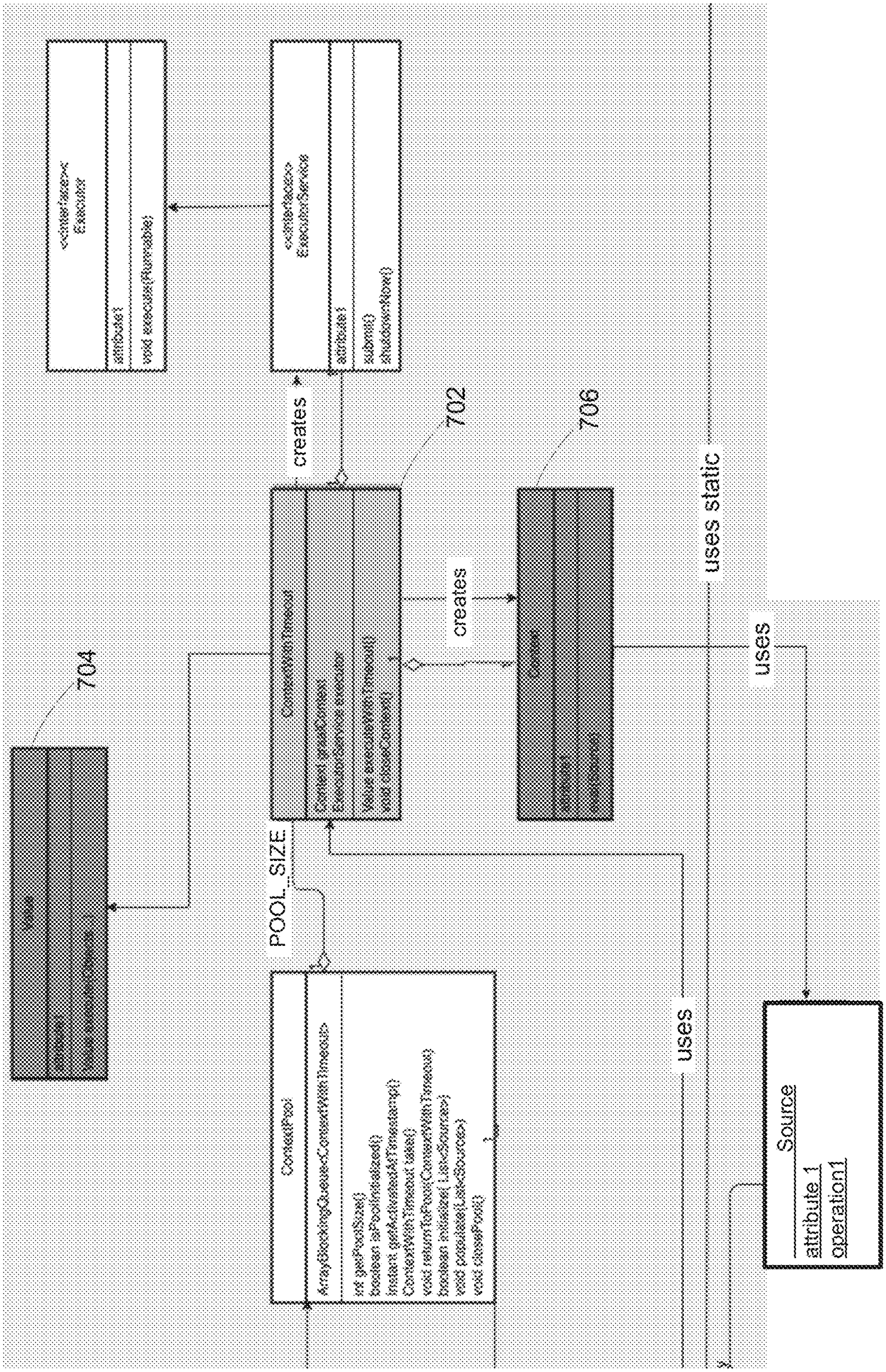
FIG. 7 shows a timeout according to the example.

FIG. 7 shows a simplified view of one implementation of such a timeout. In particular, 702 is the wrapper class that manages to scripting engine ("Context") and ensures the timeout during execution. The objects 704 and 706 belong to the graal.js API.

Access to services afforded according to various embodiments, may offer one or more benefits. Specifically, one possible benefit is reduced communication/overhead, by allowing execution of custom code on/inside the service.

Another possible benefit is security. Embodiments may also address possible security challenges for at least one or more of the following levels:

Model Development;

Code Generation;

Runtime.

For model development, in order to maintain control over the customer code, this example uses a visual programming approach. The visual programming editor is based on the Google Blockly library. This allows the addition of custom blocks, and can also be extended and modified with plugins.

Blockly provides a library of blocks that support the creation of general programs. This particular example further provides a supplemental library of blocks specifically for the creation of extensions for the Variant Configuration and Pricing Service.

These supplemental blocks ensure that the model fulfills the API contract (the specification re: how to create extensions). For example, there are specific blocks for the process_formula and collect_attributes methods, which are implemented by an extension with the required input and output values.

A possible advantage of the modelling approach (as compared to direct code upload to the cloud), is that the modelling approach follows a white-list approach (only the SAP Blocks are allowed and available). By contrast, a code upload approach would follow a blacklist (e.g., prevent inclusion of certain libraries are execution of certain statements).

Blockly also allows to limit the total number of blocks used in a model, as well as limiting the number of instances of a specific block. The latter is used by the Variant Configuration and Pricing Service to ensure that an extension model contains only one process_formula and one collect_attributes block.

Embodiments provides a model editor based on Blockly as an extension for BAS and the vscode from Microsoft as shown in FIG. 5. Embodiments may be implemented with Continuous Integration and Delivery (CI/CD) by SAP to support the deployment of extension via a CI/CD pipeline. It is noted that integration with a code versioning system (such as github) is provided by BAS and vscode.

Code generation in this example is now discussed. The models are converted into code before execution by the scripting engine. The code generation belongs to the blocks, and is therefore delivered and under full control.

Since embodiments execute the code with the graal.js API, and Blockly already provides plain JavaScript code generators for it block library, the models for Variant Configuration and Pricing will be converted into JavaScript code as well.

Embodiments generate and manage the code internally, so that a customer cannot access and modify the generated code. To support testing on the developer's machine, embodiments may also provide specific generators that do not depend on functionality that is only available in the service environment.

The code generation of this example also allows including additional cross-cutting statements into the generated code. An example is statements that limit number of iterations in a loop and log information to improve supportability.

Runtime security is now discussed. This particular example uses the graal.js engine and also supports the JSR-223 Script Engine API.

Embodiments instantiate and manage the scripting engine. This allows the implementation of a timeout control mechanism as is described later below.

Embodiments allow the implementation of additional monitoring capabilities (e. g. number of calls or runtime measurement). These monitoring capabilities can be exposed to the administration of the Variant Configuration and Pricing Service In the secure by default state, the generated JavaScript code cannot access the Java environment. However, graal.js supports a whitelisting approach for the Java-JavaScript interoperability. In this mode, only explicitly released methods of Java objects are accessible from within the scripting engine.

Returning now to FIGS. 1 and 3A-3B, these particular embodiments depict the localization engine being positioned outside of the database. However, this is not required.

Rather, alternative embodiments could leverage the processing power of an in-memory database engine (e.g., the in-memory database engine of the HANA in-memory database available from SAP SE), in order to perform one or more various functions as described above, including but not limited to:

generating the customized code;

storing the customized code;

loading the customized code;

executing the customized code.

Figure 11:
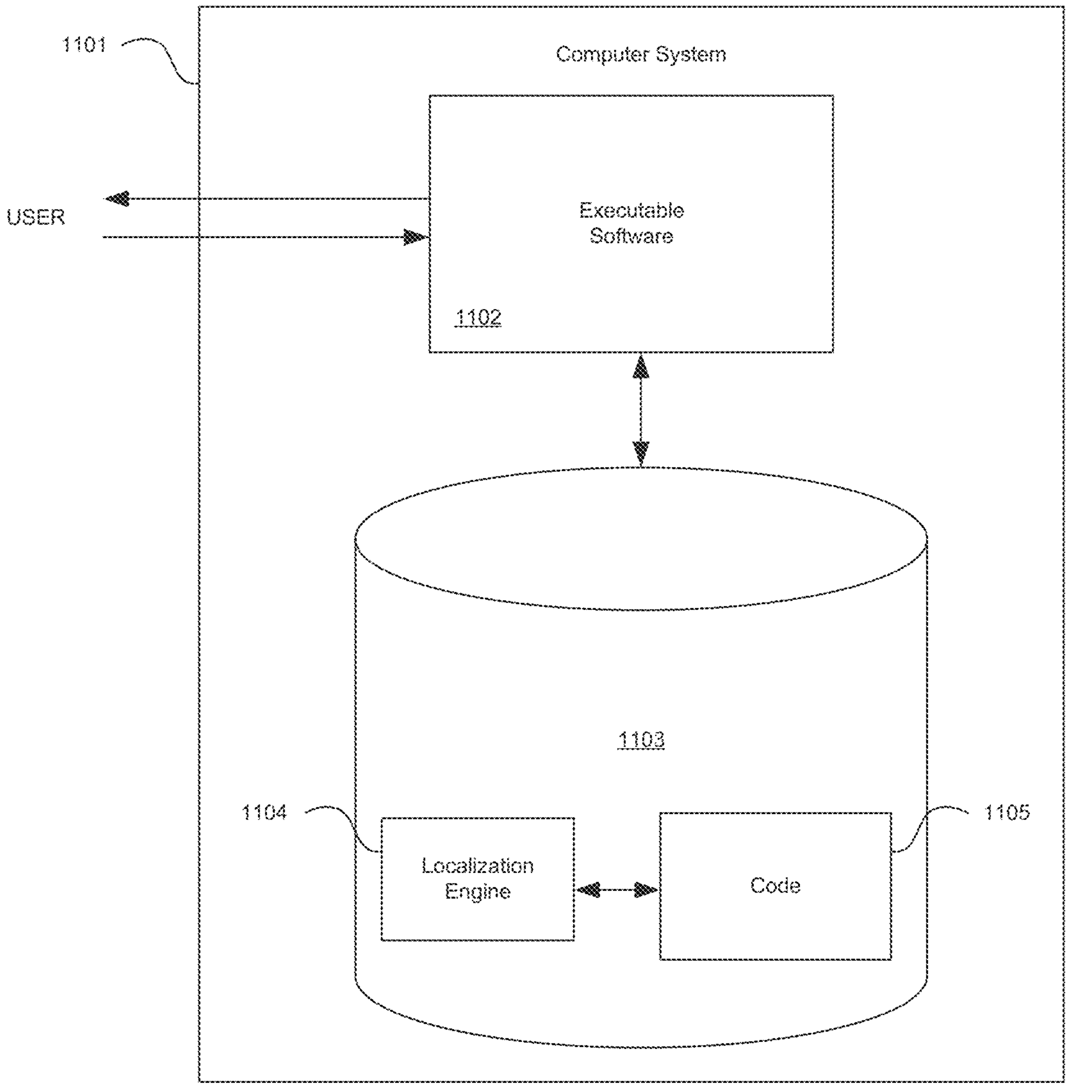
FIG. 11 illustrates hardware of a special purpose computing machine configured to implement service access according to an embodiment.

Thus FIG. 11 illustrates hardware of a special purpose computing machine configured to perform service access according to an embodiment. In particular, computer system 1101 comprises a processor 1102 that is in electronic communication with a non-transitory computer-readable storage medium comprising a database 1103. This computer-readable storage medium has stored thereon code 1105 corresponding to a localization engine. Code 1104 corresponds to code resulting from a visual coding interface. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented systems and methods comprising:

receiving a service request dispatched from a service at a first location based upon a service extension;

at the first location, loading code from a non-transitory computer readable storage medium;

at the first location, executing the code to process the service request to produce an output; and communicating the output back to the service at the first location, for processing with reference to a system at a second location remote from the first location.

Example 2. The computer implemented systems or methods of Example 1 further comprising:

generating the code at the first location; and storing the code in the non-transitory computer readable storage medium.

Example 3. The computer implemented systems or methods of any of Examples 1 or 2 wherein the code is generated using a visual coding interface.

Example 4. The computer implemented systems or methods of any of Examples 1, 2, or 3 wherein the service request is processed based upon a context.

Example 5. The computer implemented systems or methods of Example 4 wherein:

the context includes a timer; and processing the service request further comprising triggering a timeout based upon the timer.

Example 6. The computer implemented systems or methods of any of Examples 1, 2, 3, 4, or 5 wherein the non-transitory computer readable storage medium is at the first location.

Example 7. The computer implemented systems or methods of any of Examples 1, 2, 3, 4, 5, or 6 wherein the non-transitory computer readable storage medium comprises a database.

Example 8. The computer implemented systems or methods of Example 7 wherein the database comprises an in-memory database.

Example 9. The computer implemented systems or methods of Example 8 wherein an in-memory database engine of the in-memory database executes the code.

Figure 12:
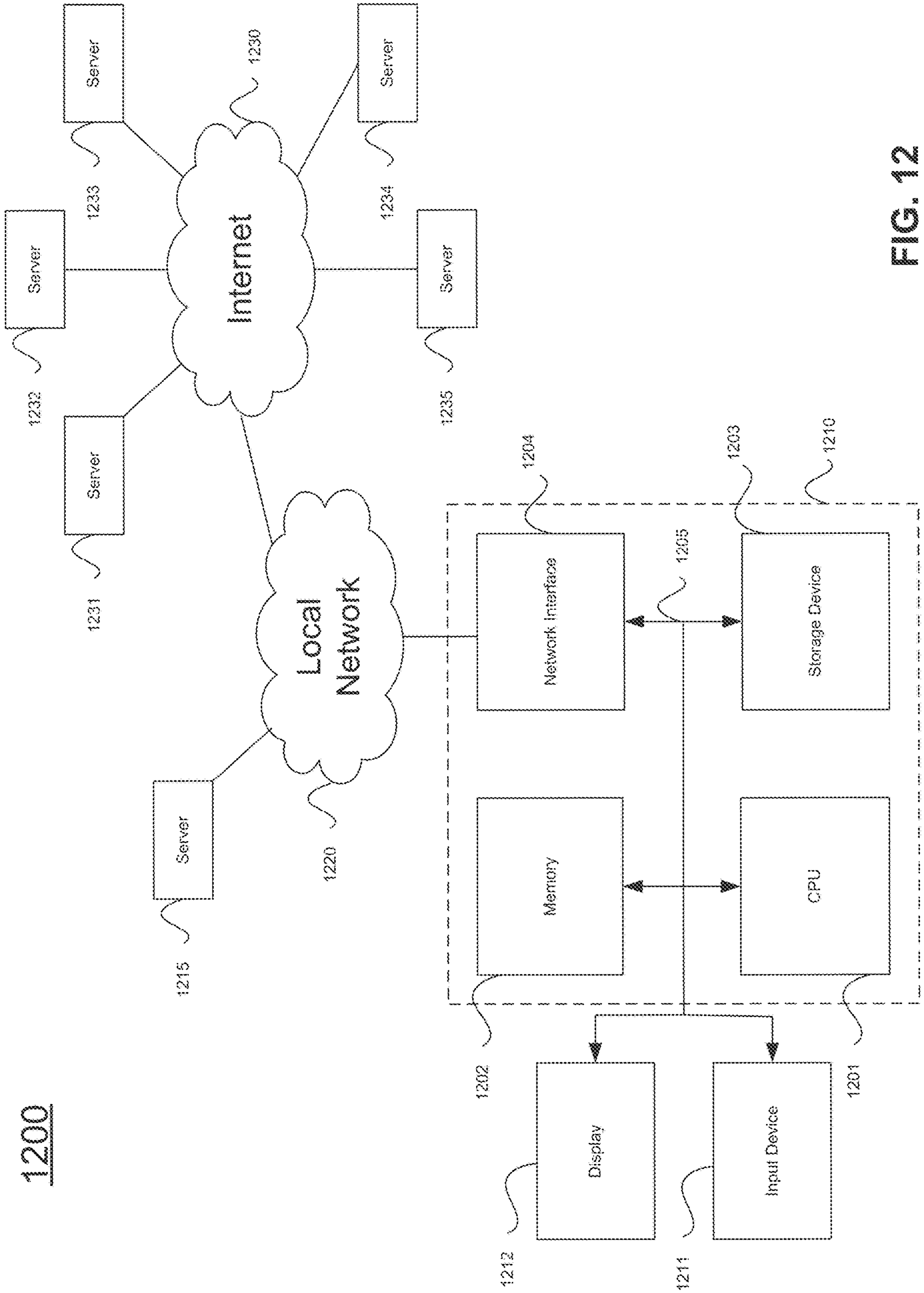
FIG. 12 illustrates an example computer system.

An example computer system 1200 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques above, for example. Storage device and memory are both examples of computer readable mediums.

Computer system 1210 may be coupled via bus 1205 to a display 1212, such as a Light Emitting Diode (LED) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:

receiving a service request dispatched from a service at a first location based upon a service extension identifying customized code associated with the service request;

recognizing, by a dispatcher at the first location, the service extension as implicating execution of localized customized code;

dispatching, by the dispatcher, the service request to a localization engine at the first location based upon the recognized service extension;

at the first location, loading, by a loader of the localization engine, the customized code from a database of code from a non-transitory computer readable storage medium located at the first location;

at the first location, executing, by an executor of the localization engine, the customized code within a scripting engine to process the service request to produce an output; and communicating the output back to the service at the first location, for processing with reference to a system at a second location remote from the first location.

2. A method as in claim 1 further comprising:

generating the code at the first location; and storing the code in the non-transitory computer readable storage medium.

3. A method as in claim 1 wherein the code is generated using a visual coding interface.

4. A method as in claim 1 wherein the service request is processed based upon a context.

5. A method as in claim 4 wherein:

the context includes a timer; and processing the service request further comprising triggering a timeout based upon the timer.

6. A method as in claim 1 wherein the non-transitory computer readable storage medium is at the first location.

7. A method as in claim 1 wherein the non-transitory computer readable storage medium comprises a database.

8. A method as in claim 7 wherein the database comprises an in-memory database.

9. A method as in claim 8 wherein an in-memory database engine of the in-memory database executes the code.

10. A non-transitory computer readable storage medium embodying a computer program for performing operations comprising:

receiving a service request dispatched from a service at a first location based upon a service extension identifying customized code associated with the service request;

recognizing, by a dispatcher at the first location, the service extension as implicating execution of localized customized code;

dispatching, by the dispatcher, the service request to a localization engine at the first location based upon the recognized service extension;

at the first location, loading, by a loader of the localization engine, the customized code from a database of code from a non-transitory computer readable storage medium located at the first location;

at the first location, executing, by an executor of the localization engine, the customized code within a scripting engine to process the service request to produce an output; and communicating the output back to the service at the first location, for processing with reference to a system at a second location remote from the first location.

11. A non-transitory computer readable storage medium as in claim 10 wherein the operations further comprises:

generating the code at the first location; and storing the code in the database.

12. A non-transitory computer readable storage medium as in claim 10 wherein:

the code is processed based upon a context including a timer; and a timeout is triggered by the timer.

13. A non-transitory computer readable storage medium as in claim 10 wherein the database is at the first location.

14. A non-transitory computer readable storage medium as in claim 10 wherein the database comprises an in-memory database.

15. A non-transitory computer readable storage medium as in claim 14 wherein an in-memory database engine of the in-memory database executes the code to process the service request.

16. A computer system comprising:

one or more processors;

a software program, executable on said computer system, the software program configured to cause an in-memory database engine of an in-memory database to:

receive a service request dispatched from a service at a first location based upon a service extension identifying customized code associated with the service request;

recognize, by a dispatcher at the first location, the service extension as implicating execution of localized customized code;

dispatch, by the dispatcher, the service request to a localization engine at the first location based upon the recognized service extension;

at the first location, load, by a loader of the localization engine, the customized code from a database of code from a non-transitory computer readable storage medium located at the first location;

at the first location, execute, by an executor of the localization engine, the customized code within a scripting engine to process the service request to produce an output; and communicate the output back to the service at the first location, for processing with reference to a system at a second location remote from the first location.

17. A computer system as in claim 16 wherein the in-memory database engine is further configured to:

generate the code; and store the code in the in-memory database.

18. A computer system as in claim 16 wherein the in-memory database engine is further configured to process the code based upon a context.

19. A computer system as in claim 18 wherein:

the context includes a timer; and the in-memory database engine is configured to trigger a timeout based upon the timer.

20. A computer system as in claim 16 wherein the in-memory database engine is configured to recognize the service extension.

* * * * *